(No Model.)

J. ADLER.
COMPASS ATTACHMENT FOR MAPS.

No. 336,883. Patented Mar. 2, 1886.

Witnesses:
Robt Roy
Wm A Lowe

Inventor:
Joseph Adler
by his attorneys
Roeder & Brieren

UNITED STATES PATENT OFFICE.

JOSEPH ADLER, OF LEIPSIC, SAXONY, GERMANY.

COMPASS ATTACHMENT FOR MAPS.

SPECIFICATION forming part of Letters Patent No. 336,883, dated March 2, 1886.

Application filed May 5, 1885. Serial No. 164,460. (No model.)

*To all whom it may concern:*

Be it known that I, JOSEPH ADLER, of Leipsic, Germany, have invented a new and Improved Compass, of which the following specification is a full, clear, and exact description.

This invention relates to a compass which is attached directly to a map or chart having a north line, so that a tourist may at any time place the map in a correct position. In this way the tourist is enable to readily locate the places illustrated in the map.

The invention refers, furthermore, to an attachment to the compass which serves as a sun-dial.

The invention consists in the elements of improvement hereinafter more fully pointed out.

Figure 1:
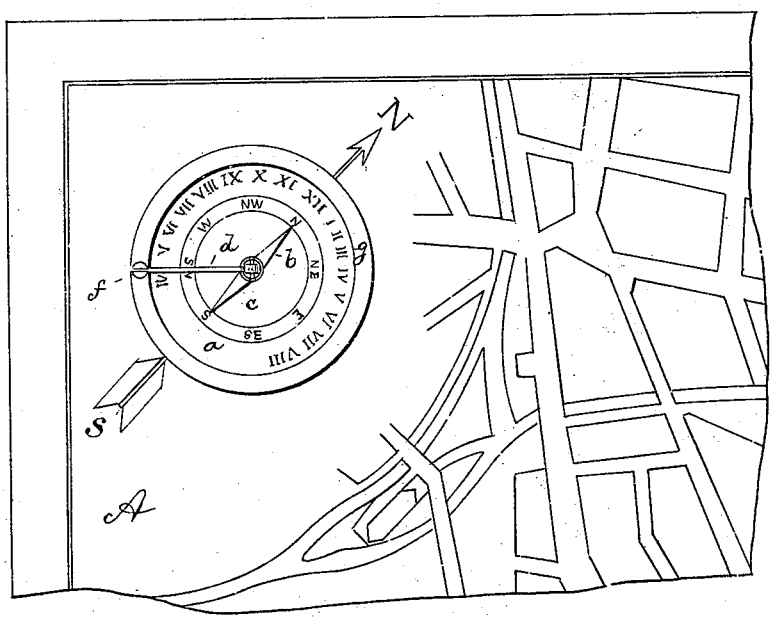
Figure 2:
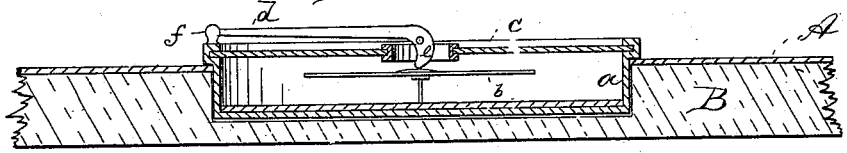
Figure 3:
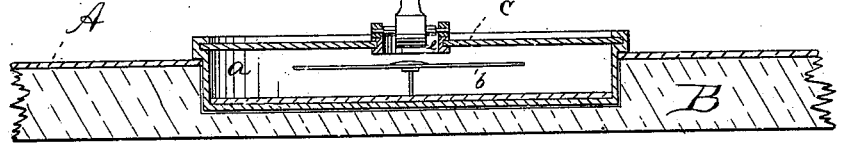

In the accompanying drawings, Figure 1 is a plan view of a map provided with my improved compass. Fig. 2 is a central section of the compass with the gnomon swung down, and Fig. 3 is a similar view with the gnomon swung up.

The letter A represents a map or chart mounted upon a wooden or other back, B. This back has a circular cavity to receive the case $a$ of a compass, the needle $b$ of which is free to turn upon a pivot, as usual.

N S is the north line marked or indicated on map A. In use the tourist turns his map until the north line corresponds with the needle, when the map will correspond in location to the country where it is used. The case $a$ is covered by a glass disk, $c$, having a central aperture surrounded by a metal ring. This ring forms the bearings for the gnomon $d$, arranged so that it may be folded up or down. The gnomon $d$ has a hook or projection, $e$, which holds down the needle $b$ when the gnomon is swung down. In this position the free end of the gnomon is held in position and protected by a suitable catch, $f$.

$g$ is the lower dial, used in connection with the gnomon in the customary manner.

I claim as my invention—

1. The combination of map A, having line N S, and mounted on back B, with the case $a$, sunk into back B and carrying compass-needle $b$, substantially as specified.

2. The combination of case $a$, needle $b$, disk $c$, and gnomon $d$, having projection $e$, with catch $f$ and dial $g$, substantially as specified.

In testimony whereof I have signed my name to this specification in the presence of two subscribing witnesses.

JOSEPH ADLER.

Witnesses:
EDMUND BACH,
HEINRICH ZUSKE.